United States Patent
Hatch et al.

(10) Patent No.: US 7,055,828 B2
(45) Date of Patent: Jun. 6, 2006

(54) SHAFT SEAL

(75) Inventors: Frederick R. Hatch, Ann Arbor, MI (US); Matthew J. Cibor, Rochester, MI (US); David M. Toth, Brighton, MA (US); Ronald J. Krimmer, Canton, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 125 days.

(21) Appl. No.: 10/394,272

(22) Filed: Mar. 21, 2003

(65) Prior Publication Data

US 2003/0184021 A1    Oct. 2, 2003

Related U.S. Application Data

(60) Provisional application No. 60/367,926, filed on Mar. 26, 2002.

(51) Int. Cl.
*F16J 15/32*    (2006.01)

(52) U.S. Cl. .............. 277/570; 277/571; 277/551; 277/562; 277/351

(58) Field of Classification Search .......... 277/551, 277/572, 571, 570, 562, 349, 351; 29/428, 29/468, 272
See application file for complete search history.

(56) References Cited

U.S. PATENT DOCUMENTS

| | | | | |
|---|---|---|---|---|
| 2,804,324 A * | 8/1957 | Stallings | ............ | 277/569 |
| 4,126,320 A * | 11/1978 | Pendleton | ............ | 277/568 |
| 4,470,185 A * | 9/1984 | Weber | ............ | 29/235 |
| 4,551,898 A * | 11/1985 | Provost | ............ | 29/235 |
| 4,643,436 A * | 2/1987 | Jackowski | ............ | 29/527.1 |
| 4,696,479 A | 9/1987 | Karcher | | |
| 4,723,350 A * | 2/1988 | Kobayashi et al. | ............ | 29/417 |
| 4,906,009 A | 3/1990 | Saitoh | | |
| 4,928,979 A | 5/1990 | Nagasawa | | |
| 4,936,591 A | 6/1990 | Romero | | |
| 4,986,553 A * | 1/1991 | Preston et al. | ............ | 277/559 |
| 5,052,695 A * | 10/1991 | Curtis | ............ | 29/235 |
| 5,096,207 A | 3/1992 | Seeh et al. | | |
| 5,186,472 A | 2/1993 | Romero et al. | | |
| 5,201,529 A | 4/1993 | Heinzen | | |
| 5,207,436 A * | 5/1993 | Lederman | ............ | 277/353 |
| 5,209,499 A | 5/1993 | Ruff et al. | | |
| 5,398,942 A | 3/1995 | Duckwall et al. | | |
| 5,462,287 A * | 10/1995 | Hering et al. | ............ | 277/559 |
| 5,522,600 A | 6/1996 | Duckwall | | |

(Continued)

FOREIGN PATENT DOCUMENTS

EP    0272775    6/1988

(Continued)

*Primary Examiner*—Alison K. Pickard
(74) *Attorney, Agent, or Firm*—Dickinson Wright PLLC

(57) ABSTRACT

A lubricant seal assembly has an outer seal component and a separate inner wear sleeve. The outer seal component has a carrier and a PTFE seal element which lays down against the wear sleeve to provide a seal collar extending to an oil side of the seal assembly. The wear sleeve is formed on an air side of the assembly with an end flange, but is free of any such flanges on the oil side. The end flange has an axial portion extending into the seal component to define a labyrinth debris exclusion path. One or more elastomeric debris exclusion lips are formed on the carrier and are precisely positioned relative to the wear sleeve with the aid of an installation tool that engages end faces of the seal component and wear sleeve to press them into precise axial alignment relative to one another in repeatable fashion.

18 Claims, 2 Drawing Sheets

U.S. PATENT DOCUMENTS

| | | | |
|---|---|---|---|
| RE35,309 E * | 8/1996 | Matsushima et al. | 277/351 |
| 5,553,870 A | 9/1996 | Czekansky et al. | |
| 5,607,168 A * | 3/1997 | Dahll | 277/568 |
| 5,611,548 A | 3/1997 | Dahlhaus | |
| 5,676,383 A | 10/1997 | Chandler | |
| 5,895,052 A | 4/1999 | Drucktenhengst et al. | |
| 5,997,005 A * | 12/1999 | Gold et al. | 277/402 |
| 6,003,871 A * | 12/1999 | Poll | 277/309 |
| 6,065,198 A * | 5/2000 | Vitous et al. | 29/258 |
| 6,170,833 B1 | 1/2001 | Cox et al. | |
| 6,220,600 B1 * | 4/2001 | Tripathy et al. | 277/309 |
| 6,257,587 B1 | 7/2001 | Toth et al. | |
| 6,273,428 B1 | 8/2001 | Sassi | |
| 6,485,185 B1 | 11/2002 | Conway et al. | |

FOREIGN PATENT DOCUMENTS

| | | |
|---|---|---|
| WO | WO 0113014 | 2/2001 |

* cited by examiner

SHAFT SEAL

This application claims the benefit of U.S. Provisional Application No. 60/367,926, filed Mar. 26, 2002.

BACKGROUND OF THE INVENTION

1. Technical Field

This invention relates generally to shaft seals, and more particularly to those including a wear sleeve.

2. Related Art

Commonly owned U.S. Pat. No. 5,676,383 to Chandler discloses a shaft seal assembly having an outer carrier which mounts in a bore of housing. The carrier has an inner flange on which a body of elastomeric material is molded. The elastomer body is configured to provide a primary sealing lip and two diverging secondary dust exclusion lips. An inner wear sleeve component mounts about a shaft for rotation therewith relative to the carrier and elastomer seal body. The primary seal runs on an outer surface of a cylindrical body of the wear sleeve and provides a barrier to the escape of fluid within the housing. The wear sleeve has an end flange that extends radially outwardly of the body and is turned axially inwardly at its free end back toward the carrier on an air side of the seal. The secondary diverging dust lips extend in close proximity to the cylindrical body and axially inward flange portion of the wear sleeve to block the entrance of debris into the seal. In order to capture the wear sleeve detachably on the elastomer body, the axially inner end of the wear sleeve is formed with a radially outwardly turned retaining flange which acts to confront the elastomer body when an axially outward force is applied to the wear sleeve to prevent the wear sleeve from becoming separated from the elastomer body. One drawback to such a seal configuration is that the primary elastomer seal lip is best suited for light duty applications, but is not well suited for use in heavy duty seal applications, such as in heavy power equipment, where the environment encountered by the seal is extremely dirty and the seal is prone to operating under dry, abrasive, hot conditions. Another drawback to such unitized seals is that the radially outward bending of the retaining flange of the wear sleeve has the effect of stressing the wear sleeve such that the outer sealing surface is no longer truly cylindrical and flat in the axial direction, but has a cylindrical dip or depression in the outer sealing surface inward from the retaining flange. While such a depression may not pose a serious problem since the line contact of the elastomer lip can readily conform to the shape of the sealing surface, such a deformity in the sealing surface may cause problems with other type of seals, such as PTFE seals which are typically bent to form an axial collar which lays down against the outer running surface of the sleeve and extends along a considerable portion of the wear sleeve running surface, including into the region which would be deformed out of shape in response to forming the inner capturing end flange of the wear sleeve. Such a lay-down type PTFE seal is shown, for example, in commonly owned U.S. Pat. No. 6,257,587. With such lay-down PTFE primary seals, the inward retaining flange formed on the wear sleeve can thus distort the running surface that the seal collar rides against, impairing its sealing effectiveness.

Another problem encountered with unitized-type oil seals is that there is presently no good way of installing them about the shaft and within a bore of the housing in a manner that precisely aligns the wear sleeve axially with respect to the carrier and seal elements of the carrier on a repeatable basis during original installation and replacement in the field. The seal assembly disclosed in the mentioned U.S. Pat. No. 5,676,383 is mounted within the bore of the housing, inset from an end face. There is no disclosure as to how the axial relationship of the wear sleeve and carrier are maintained or controlled during installation. However, this particular design may be relatively insensitive to variations in the axial positioning of the wear sleeve relative to the carrier, since the divergent dust exclusion lips are located off radially outwardly and inwardly facing surfaces of the body and axial flange portion of the wear sleeve, and not off the axially inner face of the radial end flange of the wear sleeve, such that a small variation in the location of the wear sleeve relative to the carrier does not disturb the spacing of the divergent lips relative to their neighboring radially inwardly and outwardly facing surfaces of the wear sleeve. The spacing between the divergent lips and these neighboring surfaces is considerably less than the spacing between the lips and the axially inner face of the end flange of the wear sleeve. The axial flange portion of the end flange is further of such length that axial inward displacement of the wear sleeve relative to the carrier causes the inward end of the flange portion to abut the carrier, precluding the possibility of contact of the divergent dust lips with the axially inner face of the end flange. In other words, the spacing between the radially outermost dust lip and the axially inner face of the end flange is greater than the spacing between the axial flange portion and the surface of the carrier which it confronts if the wear sleeve is displaced axially inwardly, precluding the possibility of the radially outward most dust lip from contacting the axially inner face of the end flange.

U.S. Pat. No. 5,895,052 is another example of an integrated shaft seal having a wear sleeve captured by an elastomeric body molded to a carrier by means of an outwardly bent retaining flange of the wear sleeve. Primary and two secondary lips are formed in one piece from the same elastomeric material, presenting a primary seal lip which makes line contact with the outer sealing surface of the cylindrical wear sleeve body adjacent the retaining flange. There is no disclosure as to how one installs such a seal in a way that assures the proper or desired relative axial positioning of the wear sleeve relative to the carrier in a precise, repeatable manner so as to maintain the crucial spatial relationship of the components for correct operation of the labyrinth flow path set up on the air side of the seal by the dust lips and adjacent surfaces of the wear sleeve. Accordingly, the seal assembly disclosed in U.S. Pat. No. 5,895,052 shares many of the same limitations of the seal assembly disclosed in U.S. Pat. No. 5,676,383, particularly with regard to ease of installation and axial alignment of the wear sleeve and carrier components, and distortion of the outer running surface of the wear sleeve adjacent the axially inner end of the wear sleeve due to bending deformation of the wear sleeve in order to provide a radially outwardly extending retaining flange or projection which confronts the primary seal to preclude separation of the wear sleeve from the carrier.

A seal assembly constructed according to the present invention greatly minimizes or overcomes the foregoing shortcomings of prior art seal devices.

SUMMARY OF THE INVENTION

A lubricant seal assembly constructed according to the present invention comprises an outer seal component mountable within a bore of a housing having an annular carrier and an annular PTFE seal element supported on the carrier. An inner wear sleeve has an annular body portion mountable about a rotatable shaft extending through the bore of the housing and rotatable with the shaft relative to the outer seal component, and an end flange portion projecting radially outwardly of the body portion from an air side end of the wear sleeve. The PTFE seal element is disposed about and extends axially along the sealing surface of the body portion of the wear sleeve toward an axially inner end region of the wear sleeve opposite the end flange. The axially inner end region of the wear sleeve extends radially outwardly preferably no further than the sealing surface of the body portion of the wear sleeve.

According to a preferred embodiment of the invention, the outer seal component and flange portion of the inner wear sleeve are formed with end faces that are engagable by an installation tool for installing the outer seal component and wear sleeve within a bore of a housing and about a rotatable shaft extending through the bore, respectively. According to a further preferred feature of the invention, the outer seal component and wear sleeve are installed with their end faces aligned in the same plane with the aid of the installation tool, enabling precise, repeatable axial positioning of the outer seal component relative to the wear sleeve. According to still a further feature of the invention, the outer seal component includes a pair of elastomeric debris exclusion lips, one of which extends axially inwardly toward but is spaced from said body portion of said wear sleeve, and the other of which extends axially outwardly toward but is spaced from the end flange of the wear sleeve.

One advantage of the present invention associated with forming the inner end region of the wear sleeve free of any flanges or other features extending beyond the seal surface of the wear sleeve is that it enables the body portion of the wear sleeve to be formed with a sealing surface that is truly cylindrical and free of distortion at or near the inner oil side end of the wear sleeve that could inhibit the sealing function of the PTFE element. With the lay-down PTFE seal element constricted about the body portion of the wear sleeve and extending in the direction of the oil side of the wear sleeve, the constricting force of the PTFE seal element is sufficient to support the wear sleeve against inadvertent separation from the outer seal component in an axial direction toward the air side of the seal assembly after insertion of the wear sleeve through the outer seal component and prior to installation and use.

According to a further preferred feature of the invention, the outer seal component includes at least one elastomeric debris exclusion lip which is precisely positioned relative to the wear sleeve with the assistance of the installation tool mentioned above.

According to a further preferred aspect of the invention, the wear sleeve end flange is formed at its radially outer end with an axially inner extending flange portion which extends into an open space of the outer seal component to form a labyrinth debris-exclusion path on the air side of the seal assembly. Such path enhances the dirt exclusion capabilities of the seal assembly.

THE DRAWINGS

These and other features and advantages of the present invention will become more readily appreciated when considered in connection with the following detailed description and appended drawings, wherein.

DETAILED DESCRIPTION

Figure 1:
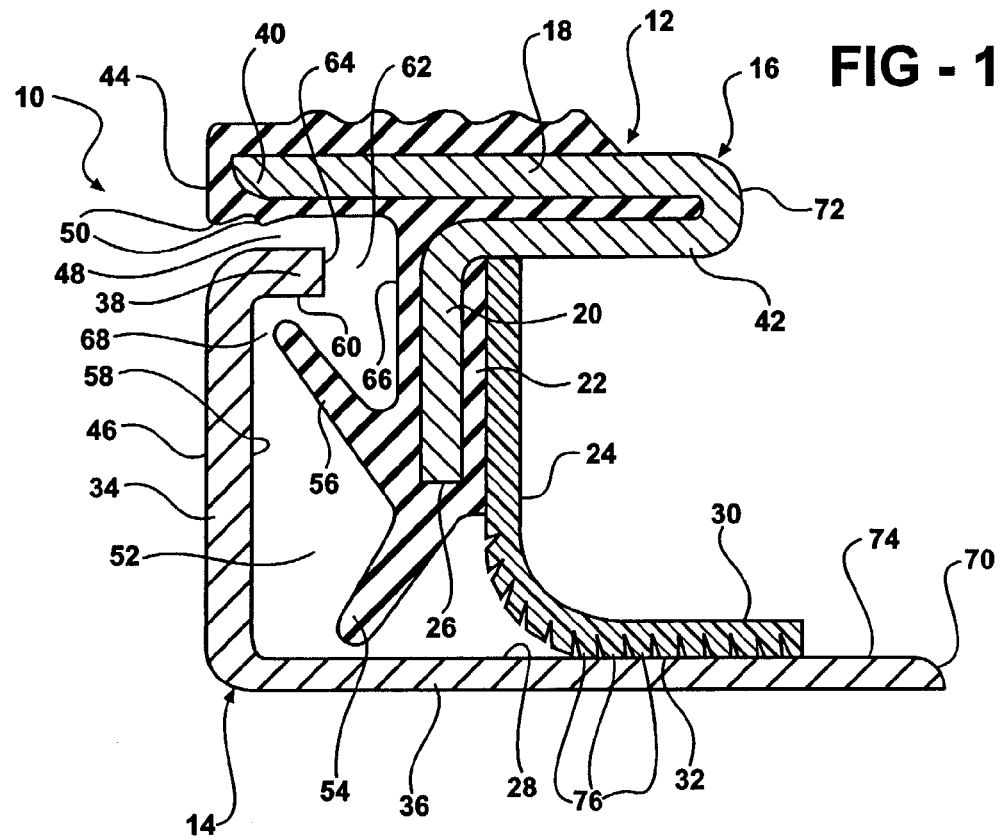
FIG. 1 is a cross-sectional view of a lubricant seal assembly constructed according to a first embodiment of the invention.
Figure 2A:
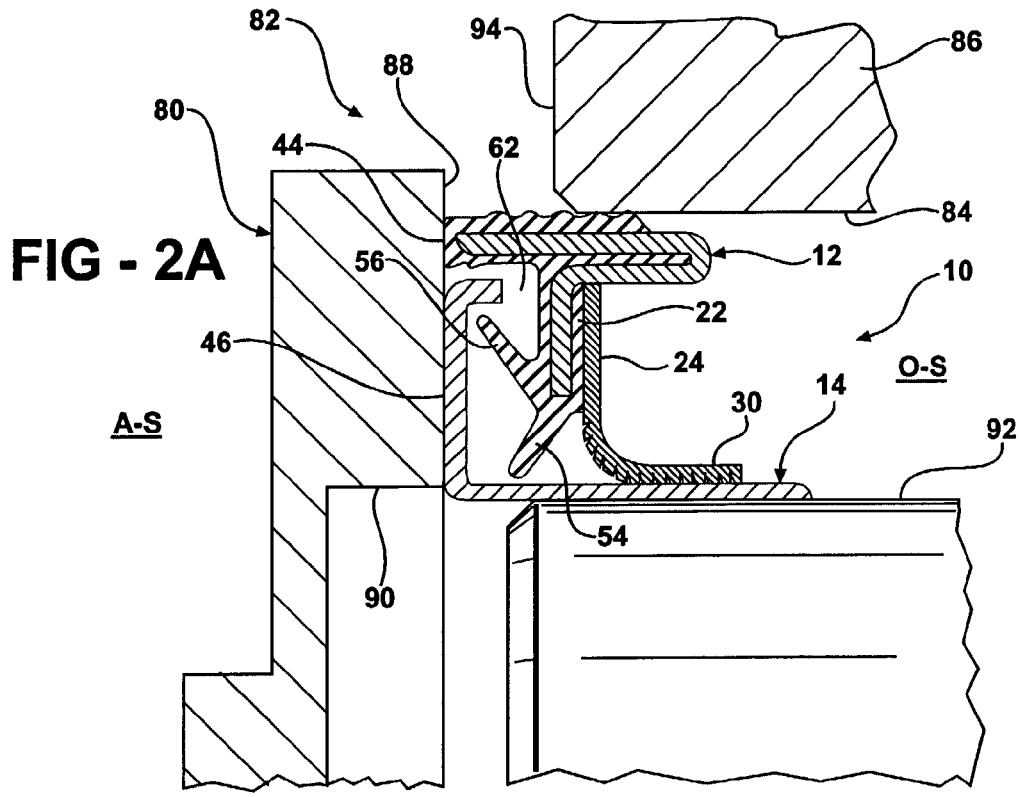
FIGS. 2a and 2b are fragmentary sectional views showing the seal assembly of FIG. 1 in different stages of installation with the aid of an installation tool.
Figure 2B:
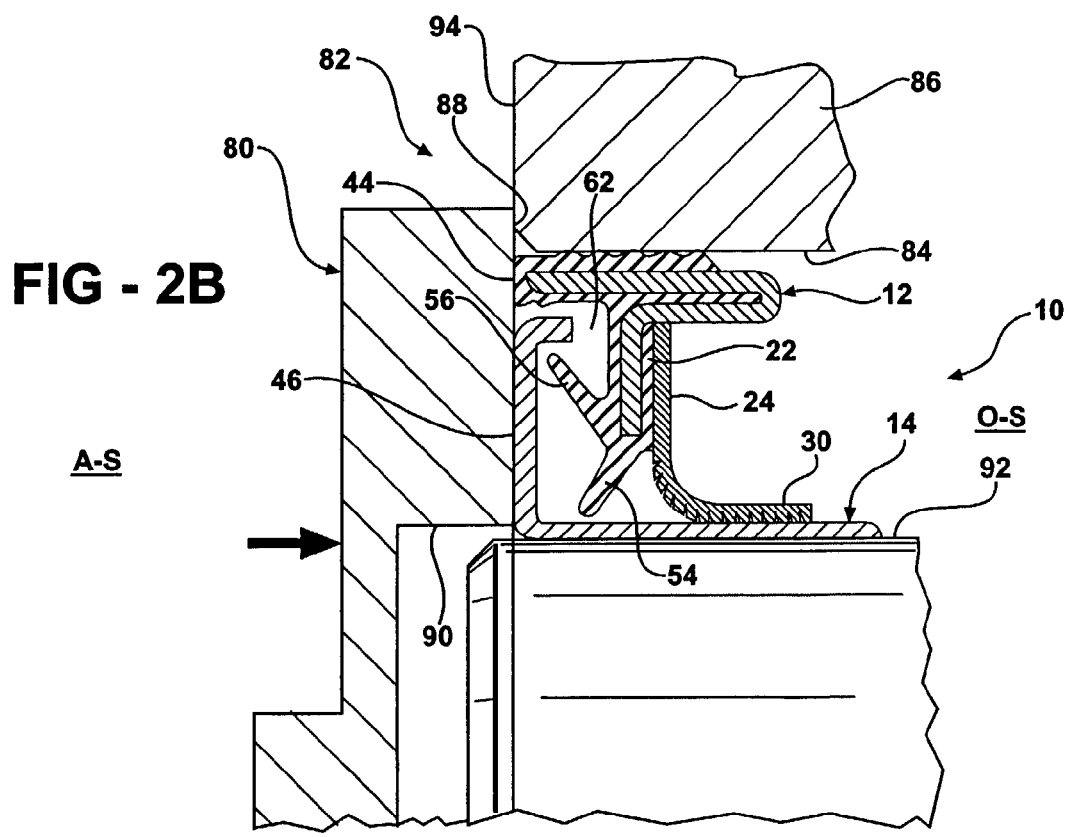

According to a first aspect of the invention and referring to the drawings of FIGS. 1 and 2A–2B, a seal assembly 10 is provided having an outer seal component 12 and an inner wear sleeve component 14. The outer seal 12 includes a carrier 16 with an axially extending body 18 and a radially inwardly extending flange portion 20. An elastomer seal body 22 is molded to the carrier and fabricated of a suitable rubber material or other elastomer.

A non-elastomer annular primary seal 24 of PTFE material is fixed on the flange 20 of the carrier 16 and projects radially inwardly from a radially inner end 26 of the flange 20. The preferred manner of securing the PTFE seal member 24 to the flange portion 20 of the carrier 16 is by bonding, although the PTFE seal 24 could also be mechanically clamped. Preferably, the elastomeric body 22 is interposed between the PTFE member 24 and the flange portion 20 and serves as a bond interface.

The PTFE seal 24 extends radially inwardly along the flange portion 20 from its radially outer end and then is bent adjacent the wear sleeve 14 to extend axially away from the elastomeric body 22 toward an oil side O-S of the seal 10. The bent portion of the PTFE seal 24 is laid down against a cylindrical outer sealing surface 28 of the wear sleeve 14 in the form of an axial collar portion 30 whose axially outer surface 32 of the PTFE member is redirected to extend axially along and engage the sealing surface 28 of the wear sleeve 14, presenting a sealing surface 32 of the collar 30.

The wear sleeve 14 has a flange 34 on an air side A-S of the seal assembly 10 which projects radially outwardly of the cylindrical wear sleeve body 36 and is then turned axially inwardly at its radially outer end such that an axial portion 38 extends axially inwardly toward the flange portion 20 of the carrier 16.

The body 18 of the carrier 16 extends axially to either side of the flange portion 20 and includes an axially outer portion 40 extending axially outwardly of the flange portion 20 toward the air side A-S of the seal 10, and an axially inner portion 42 extending axially inwardly of the flange portion 20 toward the oil side 0-S of the seal assembly 10. Preferably, the elastomeric seal material 18 extends about the carrier body 16 and around an outer end of the axially outer portion 40 of the carrier body 16, presenting an end face 44 of the outer seal component 12 which is flush with an outer end face 46 of the wear sleeve 14.

A radial gap 48 is formed between the axial flange portion 38 of the wear sleeve 14 and the axially outer portion 40 of the carrier body 16 to define a path into the seal from the air side. Preferably, the elastomeric material 22 lines the gap 48 and includes one or more ribs 50 which serve to disturb the flow of air entering the gap 48 such that any dirt or debris contained in the air flow is encouraged to settle out of the air prior to entering into the seal. Inwardly beyond the gap 48, a cavity 52 exists between the wear sleeve 14 and the flange portion 20 of the carrier 16 and is partitioned on the air side A-S of the primary PTFE seal into a labyrinth flow passage by provision of a pair of diverging excluder lips 54, 56 of the elastomeric body 18. A radially innermost one of the lips 54 projects radially inwardly and axially outwardly of the body 18 toward the outer cylindrical running surface 28 of the wear sleeve 14, and the radially outer-most one of the lips 56 projects axially and radially outwardly toward an axial inner face 58 of the end flange 34.

The dust excluder lips 54, 56 are preferably supported and maintained out of contact with their adjacent surfaces 28, 58 of the wear sleeve 14 to provide a contactless labyrinth seal on the air side A-R. The seal lip 54 may optionally ride in contact with its adjacent surface 28. The radially outer-most excluder lip 56 is preferably spaced closer to the axial inner face 58 of the end flange 34 than it is spaced from a radially inwardly facing surface 60 of the axial portion 38 of the end flange 34. A space 62 between an end 64 of the axial portion 38 of the end flange 34 and the section 66 of the outer seal component 12 lying opposite to it is greater than the axial space 68 between the radially outer-most exclusion lip 56 and the axially inner surface 58 of the end flange 34.

The axially outwardly extending portion 40 of the carrier body 16 overlaps the axial inwardly extending portion 38 of the wear sleeve 14. An axially inner end 70 of the wear sleeve 14 extends axially inwardly beyond an axial inner end 72 of the carrier 16. An axially inner end region 74 of the wear sleeve is preferably free of any deformations that would cause the wear sleeve 14 to extend radially beyond the inner contact surface 32 of the primary PTFE seal 24. In other words, the inner end 70 of the wear sleeve 14 is free of any retaining flange features or other deformed projecting features which are typically associated with unitized wear sleeves as a means of capturing them against removal from the seal component of the assembly. According to the preferred embodiment of the invention, the end region 74 of the wear sleeve 14 is preferably free of any such deformations and presents preferably a continuous, uninterrupted smooth, axially planar sealing surface 28 extending beneath and in contact with the surrounding collar 30 of the primary PTFE seal 24. As such, the sealing surface 28 of the wear sleeve 14 is non-distorted to provide optimum sealing performance of the primary PTFE seal 24 about the wear sleeve 14.

The primary seal 24 is formed with a series of spiraling hydrodynamic slits or grooves 76 cut into the running surface 32 of the seal 24 which faces the wear sleeve 14. The hydrodynamic grooves 76 may be single or multiple start threads (e.g., triple start threads) which have the effect of pumping fluid from beneath the collar 30 back toward the oil side O-S of the seal 10 should oil migrate beneath the collar 30. This hydrodynamic pumping action assists in preventing oil on the oil side O-S of the seal 10 from leaking beneath the seal to the air side A-S of the seal assembly 10.

The collar 30 imparts a constricting force about the wear sleeve 14 and provides a static seal against oil leakage when the wear sleeve 14 is not rotating with the shaft 78 on which it is installed. The constricting compressive force imparted by the sealing collar 30 against the wear sleeve 14 also has the beneficial effect of supporting the wear sleeve 14 against axial displacement toward the air side A-S of the seal 10 due to the relatively large surface contact between the lay-down collar 30 and sealing surface 28 of the wear sleeve 14 and the inherent strength and stiffness of the PTFE material which exceeds that of the elastomer body material. As such, the wear sleeve 14, once assembled with the seal component 12 is effectively retained against reverse disassembly due to the constricting force of the seal collar 30 and the resistance to the straightening of the PTFE collar counteracting an axially outward withdraw force applied to the wear sleeve 14. As such, there is no need, according to the preferred embodiment of the invention, to have a retaining flange on the axially inner end of the wear sleeve. By eliminating the requirement of retaining flange, a uniform, non-distorted sealing surface 28 of the wear sleeve 14 is maintained for optimum sealing performance of the sealing collar 30. Eliminating the need to form a retaining flange on the wear sleeve 14 further simplifies the manufacturer of such seals 10 by eliminating operations and equipment used to manufacture and assemble the components.

According to another aspect of the invention, the seal assembly 10 is combined with an installation tool 80 to provide a seal kit 82 used for installing and aligning the seal 10 properly in a bore 84 of a housing 86 to be sealed. As shown, the tool 80 has a flat, annular, planar pressing face or surface 88 which engages the axially outer end faces 44, 46 of the outer seal component and wear sleeve, bringing them into position in a common plane of the end face 88 of the tool 80. As shown, the wear sleeve 14 is slid over the shaft 78 and the body 18 of the carrier 16 guided into the bore 84 of the housing 86. The tool 80 is then pressed axially toward the oil side O-S of the seal 10 causing the wear sleeve 14 seal component 12 to move together axially inwardly, with their end faces 44, 46 aligned in the plane of the tool face 88. A hole or recess 90 is provided to enable the tool 80 to slide over the end and about an outer surface 92 of the shaft 78. The face 88 of the tool 80 extends radially outwardly beyond the bore 84 in overlapping relation to a flat end face or locating surface 94 of the housing 86. As the seal 10 is pressed axially inwardly, the face 88 of the tool 80 is caused to confront the locating surface 94 of the housing 86, precluding further inward movement of the tool 80 and the seal assembly 10 into the bore 84 and along the shaft 78. In this way, it is assured that the wear sleeve 14 and seal component 12 are precisely positioned relative to one another in the axial direction due to the alignment of the end faces 44, 46 with the reference surfaces 88 on the tool 80, and further that the seals 10 are precisely installed within the bore 84 and about the shaft 78 at a repeatable location.

While the planar end face 88 configuration of the tool 80 is preferred in conjunction with the planar aligned end faces 44, 46 of the seal component and wear sleeve, it will be appreciated that other non-planar configurations would achieve the same purpose of providing precise, repeatable alignment of the wear sleeve 14 relative to the seal component 12 and precise, repeatable location of a seal assembly 10 installed in a bore 84 of a housing 86 having a reference surface which confront the tool at full insertion.

Figure 3:
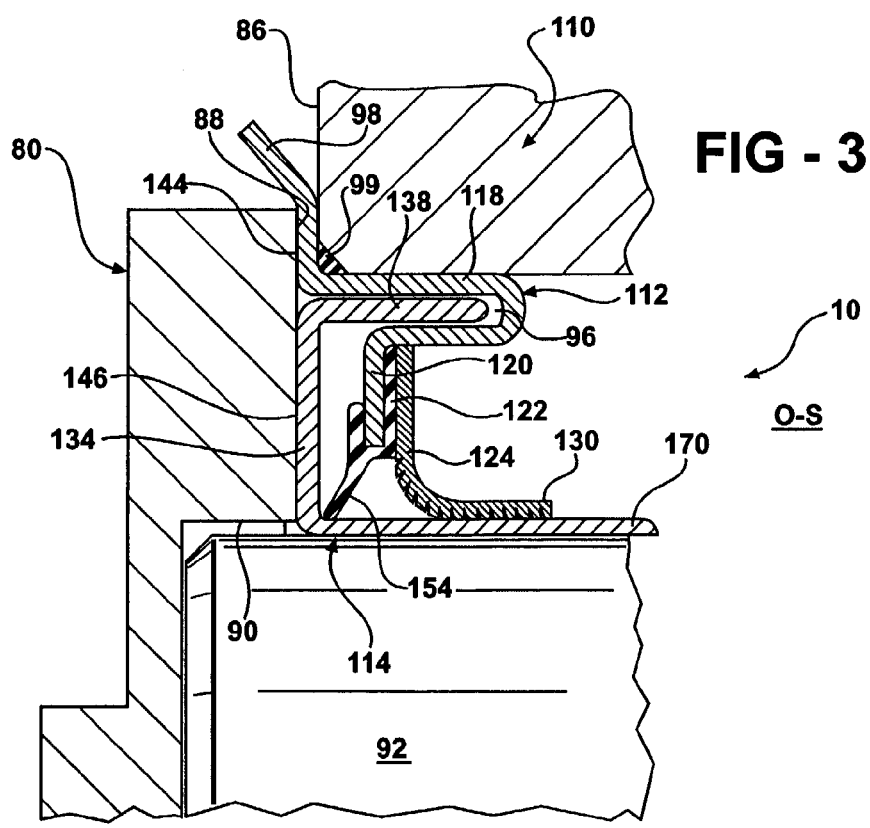
FIG. 3 is an enlarged sectional view of a lubricant seal assembly constructed according to a second embodiment of the invention shown installed with the aid of an installation tool.

FIG. 3 shows an alternative seal assembly 110 constructed according to the invention, in which the same reference numerals are used to designate like features, but are offset by 100. The assembly 110 includes a seal component 112 and a wear sleeve component 114. The seal component 112 includes a carrier 116 with a carrier body 118 and a seal flange 120 on which an elastomer seal body 122 is molded and mounts a primary PTFE seal 124. The seal 124 has an axially bent collar 130 which surrounds the cylindrical body 136 of the wear sleeve 114. An end flange 134 on the air side of the seal 110 has an axial flange portion 138 which extends axially inwardly toward the oil side and is received in an axial pocket 96 of the carrier body 118, such that a tortuous path is formed into the seal from the air side. The axial portion 138 extends axially beyond the seal flange 120. The elastomer body 122 has at least one dust excluder lip 154 which may be spaced from or run in contact with the wear sleeve 114.

The wear sleeve 114 has an axially outer surface 146 which is flush and co-planer with an end surface 144 of the carrier 112 when the axial flange 138 is received in the recess or pocket 96 of the carrier 112. The same installation tool 80 as that disclosed in connection with the seal 10 of the first embodiment may be used to install the seal 110 of the second embodiment, provided the radially outer edge 98 of the carrier is disposed outwardly of the tool such that the face 88 of the tool 80 can make contact with the ends 144, 146 of the seal and wear sleeve components 112, 114, respectively.

The wear sleeve 114 likewise is free of any inner end flange or retaining projections adjacent its inner end 170, and relies on the surrounding collar 130 to retain the sleeve 114 against removal.

The carrier 112 may be provided with external elastomer material 99 for forming an outer seal with the housing in which the seal 110 is mounted.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A lubricant seal assembly, comprising:
   an outer seal component mountable within a bore of a housing, said outer seal component including an annular carrier and an annular PTFE seal element supported on said carrier;
   an inner wear sleeve having an annular body portion mountable about a rotatable shaft extending through the bore of the housing and rotatable with the shaft relative to said outer seal component, and an end flange portion projecting radially outwardly of said annular body portion from an air side of said wear sleeve;
   said PTFE seal element disposed about and extending axially along and in direct sealing contact with a sealing surface of said annular body portion of said wear sleeve toward an axially inner end region of said wear sleeve opposite said end flange;
   said axially inner end region of said wear sleeve extending radially outwardly no further than said sealing surface of said body portion of said wear sleeve;
   said outer seal component including an axially outer-most end face surface disposed on an air side of said outer seal component in a common plane with an end face of said end flange portion of said wear sleeve, said end flange portion including an axial portion disposed radially outwardly of said end face of said end flange portion and extending axially inwardly of an axial inner face of said end flange portion, said axial portion nesting with said outer seal component to define a tortuous flow path, and
   wherein said outer seal component includes an elastomer material bonding said PTFE seal element to one side of said annular carrier facing away form said end flange portion of said wear sleeve and further defining at least one elastomer debris exclusion lip extending from said annular carrier generally toward said end flange portion radially inwardly of said axial portion of said wear sleeve so as to extend into said tortuous path; and
   wherein apart form said direct sealing contact between said PTFE seal element and said wear sleeve, there being no other physical contact between said seal component and said wear sleeve.

2. The assembly of claim 1, wherein aid axially inner end region of said wear sleeve is free of any retaining flange features that would act to capture said wear sleeve against removal past said PTFE seal element.

3. The assembly of claim 1, wherein said at least one debris exclusion lip is spaced from said PTFE seal element toward said air side of said wear sleeve axially inwardly of said end flange.

4. The assembly of claim 3, wherein said elastomer material is molded to said carrier.

5. The assembly of claim 1, wherein said at least one debris exclusion lip is supported in spaced relationship to said wear sleeve.

6. The assembly of claim 1, wherein said axial portion of said wear sleeve extends axially inwardly of said debris exclusion lip.

7. The assembly of claim 1, wherein said carrier of said outer seal component defines an axial pocket open to an air side of said outer seal component, and said axial portion extends into said pocket.

8. The assembly of claim 7, wherein said outer seal component and said end flange of said wear sleeve have co-planar end faces.

9. A method of installing a seal assembly, comprising:
   providing an outer seal component having an annular carrier and an annular PTFE seal element supported on the carrier and extending radially inwardly therefrom, and including an end face on an air side of the outer seal component;
   providing a wear sleeve formed separately from the outer seal component having an annular body portion with a radially outer sealing surface and an end flange extending radially outwardly of the body portion on an air side end of the wear sleeve and presenting an end face facing the air side, and wherein an opposite oil side end of the wear sleeve is substantially free of flange features that would extend radially outwardly of the body portion beyond the sealing surface of the body portion;
   extending the oil side end of the wear sleeve through the outer seal component causing the PTFE element to lay down and extend axially along the sealing surface of the body portion to provide a collar of the PTFE seal element about the wear sleeve;
   without further deforming the oil side end of the wear sleeve to extend radially outwardly beyond the seal surface of the body portion, engaging the end faces of the outer seal member and wear sleeve with a pressing face of an installation tool and pressing the outer seal component into a bore of the housing and pressing the wear sleeve about a rotatable shaft extending through the bore; and
   including molding at least one elastomeric debris exclusion lip on the carrier spaced from said PTFE seal element.

10. The method of claim 9 including spacing the debris exclusion lip from the seal surface of the body portion of the wear sleeve and an axially inner surface of the end flange portion of the wear sleeve.

11. A lubricant seal, comprising:
   an outer seal component mountable within a bore of a housing, said outer seal component including an annular carrier, an annular PTFE seal element secured to said carrier, and a pair of elastomeric debris exclusion lips molded on said carrier;
   an inner wear sleeve having an annular body portion mountable about a rotatable shaft extending through the bore of the housing and rotatable with the shaft relative to said outer seal component, said wear sleeve having an end flange formed on an air side of said seal projecting radially outwardly from an outer cylindrical sealing surface of said body portion, said end flange having an axially inwardly facing surface;

said PTFE seal element being disposed in direct sealing contact with and extending axially along said sealing surface of said wear sleeve toward an oil side of said seal; and one of said pair of debris exclusion lips extending radially inwardly toward but being spaced from said body portion of said wear sleeve, and the other of said pair of debris exclusion lips extending axially toward but being spaced from said axially inwardly facing surface of said end flange of said wear sleeve.

12. The seal of claim 11 wherein said wear sleeve includes an axially extending flange portion projecting axially inwardly from said end flange toward said carrier in spaced relation to said outer seal component.

13. The seal of claim 12 wherein said axially extruding flange portion extends into a recess defined between said other of said debris exclusion lips and said carrier to define a tortuous path into said seal on said air side.

14. The seal of claim 13 wherein said axially extending flange extends axially inwardly of said other debris exclusion lip.

15. The seal of claim 11 wherein said outer seal component and said end flange have end faces disposed in a common plane.

16. The seal of claim 15 wherein said one debris exclusion lip extends both radially inwardly and axially outwardly relative to said carrier.

17. The seal of claim 15 wherein said other debris exclusion lip extends both axially outwardly and radially outwardly relative to said carrier.

18. A seal assembly comprising:

an outer seal component including an annular carrier, a primary annular PTFE seal element, elastomeric bonding material securing said PTFE seal element to said carrier and defining at least one secondary debris exclusion lip extending away from said PTFE seal element;

an inner wear sleeve rotatable relative to said outer seal component including an annular body portion supported in direct sealing contact with said PTFE seal element with said PTFE seal element extending axially along said annular body portion toward an oil side of said carrier, and an end flange projecting radially outwardly of said body portion from an air side end of said wear sleeve, said end flange having an axially outer metallic pressing surface disposed in a common plane with an axially outer-most end face of said seal component; and apart from said sealing contact between aid PTFE seal element and said wear sleeve, there being no other physical contact between said seal component and said wear sleeve.

* * * * *